US008613345B1

(12) United States Patent
Booher

(10) Patent No.: US 8,613,345 B1
(45) Date of Patent: Dec. 24, 2013

(54) QUICK CHANGE COMBINATION WHEEL AND BRAKE ASSEMBLY

(76) Inventor: Benjamin V. Booher, Scottsdale, AZ (US)

( * ) Notice: Subject to any disclaimer, the term of this patent is extended or adjusted under 35 U.S.C. 154(b) by 0 days.

(21) Appl. No.: 13/247,910

(22) Filed: Sep. 28, 2011

Related U.S. Application Data

(63) Continuation of application No. 10/242,155, filed on Sep. 12, 2002, now abandoned.

(51) Int. Cl.
*F16D 65/14* (2006.01)
(52) U.S. Cl.
USPC .................... 188/18 A; 188/73.39; 188/73.46; 188/218 XL
(58) Field of Classification Search
USPC ................... 188/218 R, 17, 18, 73.39, 73.46, 188/218 XL, 18 A, 26
See application file for complete search history.

(56) References Cited

U.S. PATENT DOCUMENTS

| | | | | |
|---|---|---|---|---|
| 3,982,610 A | * | 9/1976 | Campagnolo | 188/18 A |
| 4,257,496 A | * | 3/1981 | Fujita et al. | 188/72.6 |
| 4,343,380 A | * | 8/1982 | Kawaguchi | 188/18 A |
| 4,485,897 A | * | 12/1984 | Kawaguchi et al. | 188/73.39 |
| 5,259,483 A | * | 11/1993 | Pelfrey | 188/71.1 |
| 5,388,669 A | * | 2/1995 | Holl et al. | 188/71.2 |
| 5,632,362 A | * | 5/1997 | Leitner | 188/344 |
| 6,152,267 A | * | 11/2000 | Iwai et al. | 188/26 |

* cited by examiner

*Primary Examiner* — Bradley King
(74) *Attorney, Agent, or Firm* — Booth Udall Fuller, PLC

(57) ABSTRACT

A quick mounting combined wheel and brake assembly, includes a hub for mounting on a vehicle axle for rotatably mounting a wheel and at least one component of a brake assembly, a quick connect device for detachably mounting the hub on the axle, a brake assembly having a stationary component mounted on the hub, and a rotating component mounted on and rotatable with the wheel, and a brake actuator mounted in the axle and extendable into the hub for actuating the brake assembly.

16 Claims, 3 Drawing Sheets

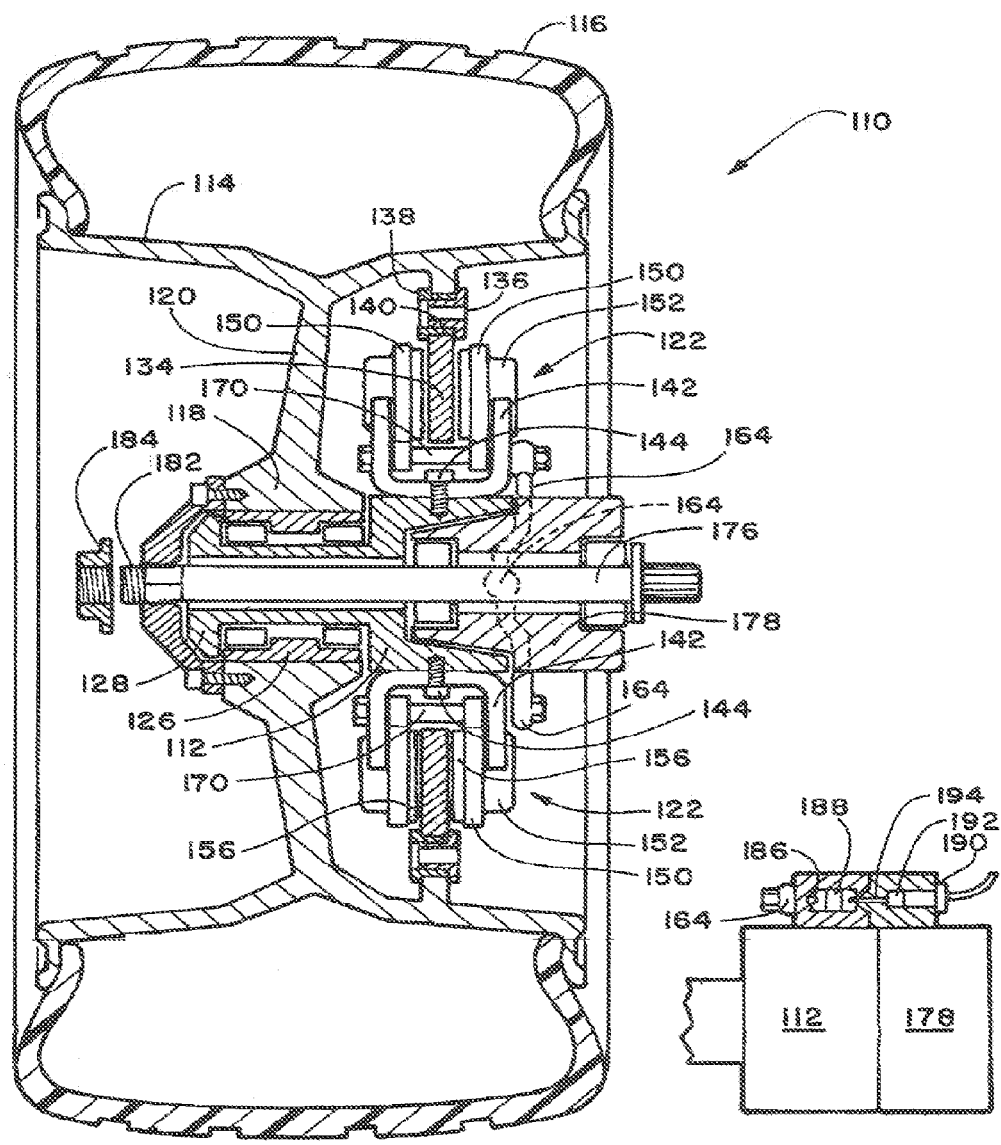

QUICK CHANGE COMBINATION WHEEL AND BRAKE ASSEMBLY

BACKGROUND OF THE INVENTION

The present invention relates generally to wheel and brake assemblies and pertains particularly to improved combination of wheel and brake wherein the brake assembly is within and removable as a unit with the wheel.

The brake systems of automobile vehicles such as cars, trucks, tractors and trailers have a friction brake unit associated with each wheel. A friction brake is basically a pair of friction members, one rotating and one stationary, brought into engagement to produce a friction force measured as brake torque for either slowing or stopping the rotating element. Brakes are preferably designed so that the brake torque is somewhat proportional to the input force used to engage the elements and the energy of the rotating member is dissipated in the form of heat.

The rotating element of a brake system is usually a disc or drum made of metal such as a steel alloy, and the stationary element is usually a composition pad or shoe lining moveable into and out of engagement with the rotating element. The composition element is designed to wear without undue wear of the metal disc or drum. The friction unit or assembly is normally mounted inboard of the wheel and coupled to a rotatable hub to which the wheel is separately and detachably mounted. This inboard mounting creates a number of disadvantages. These include difficulty in visually inspecting the parts, difficulty in gaining access for maintenance and replacement of components and poor cooling of the components of the assembly. These are disadvantages for most applications and particular disadvantages for certain applications, particularly for applications to racing cars.

The braking systems for racing cars have massive rotors and calipers in order to provide adequate braking for the duration of a race. These have to be massive because of geometric restrictions and because they cannot be readily replaced during a race because of their location, manner of attachment, and the complicated construction. The rotor can be an inch or more in thickness even when made from advanced composites and weigh several pounds. Such rotors require extended time to bring them up to operating temperature. The friction pads must also be massive in thickness in order to last the duration of the race. Even with such massive brake system, it is often necessary to take costly pit stops to rebuild them during a long race such as an endurance race.

Such massive brake systems also add considerably to the unsprung weight of the vehicle which has an ill effect on the performance of a vehicle. It complicates tire adhesion forces which affects cornering capabilities and other vehicle dynamics. It also inhibits air flow around the brake units and cooling of the brake system. This has a detrimental effect on wheel bearings, constant velocity joints and seals, and steering linkage joints and lubrication of these and other joints.

Accordingly, it is desirable that improved brake assemblies, structures and methods of manufacture be available to overcome the above and other problems of the prior art. It is also desirable that quick change brake and wheel assemblies be available.

SUMMARY OF THE INVENTION

It is the primary object of the present invention to provide improved friction brake assemblies, structures and methods that overcome the above problems of the prior art.

Another object of the present invention is to provide improved quick change brake and wheel combination.

Another object of the present invention is to provide improved quick change wheel and brake combination that is simple and inexpensive with self contained energizing means with the entire brake assembly contained within the wheel.

In accordance with a primary aspect of the present invention, a dry couple in wheel brake assembly, comprises a hub for mounting on an axle for rotatably mounting a wheel and at least one component of a brake assembly, a quick connect device for detachably mounting said hub on the axle, a brake assembly having a stationary component mounted on said hub, and a rotating component mounted on the wheel, and a self contained brake actuating system within said brake assembly.

Another aspect of the invention includes improved quick change wheel and brake combination that is simple and inexpensive with self contained energizing means with the entire brake assembly contained within the wheel.

BRIEF DESCRIPTION OF THE DRAWING

The above and other objects, nature, goals, and advantages of the invention will become more apparent to those skilled in the art after considering the following detailed description when read in connection with the accompanying drawing, illustrating by way of examples the principles of the invention, in which like reference numerals identify like elements throughout wherein:

FIG. 3 is a view like FIG. 1 illustrating the application of the invention to a driving wheel.

FIG. 4 is an elevation view in with a portion in section showing the interface between the in wheel system and vehicle system.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings. In the description, the parts and components of the present invention which are the same will be referred to by the same or similar reference symbols.

DEFINITIONS

Unless defined otherwise, all technical and scientific terms used herein have the same meaning as is commonly understood by one of skill in the art to which this invention belongs. In event the definition in this section is not consistent with definitions elsewhere, the definitions set forth in this section will control.

As used herein, dry coupling means an operative coupling between two hydraulic systems without a mingling or transfer of fluid. In the instant system a master hydraulic system actuates a slave hydraulic system through a disconnectable mechanical coupling.

As used herein, self contained actuating system means a complete actuating system requiring only an input movement for actuation. In the case of a hydraulic system it means a closed system having its own separate hydraulic fluid, an actuation or master cylinder and an actuated or slave cylinder.

General

Throughout this description, the preferred embodiment and examples shown should be considered as exemplars, rather than as limitations on the present invention.

The present invention is directed to improvements in the construction, location, mounting and operation of brake systems for automobiles and other vehicles. The present invention also provides improvements in the construction and mounting of wheels and combined wheel and brake assemblies. More specifically the present invention provides combination wheel and brake assemblies wherein the brake assembly is contained within and removable with the wheel.

Figures 1, 5:
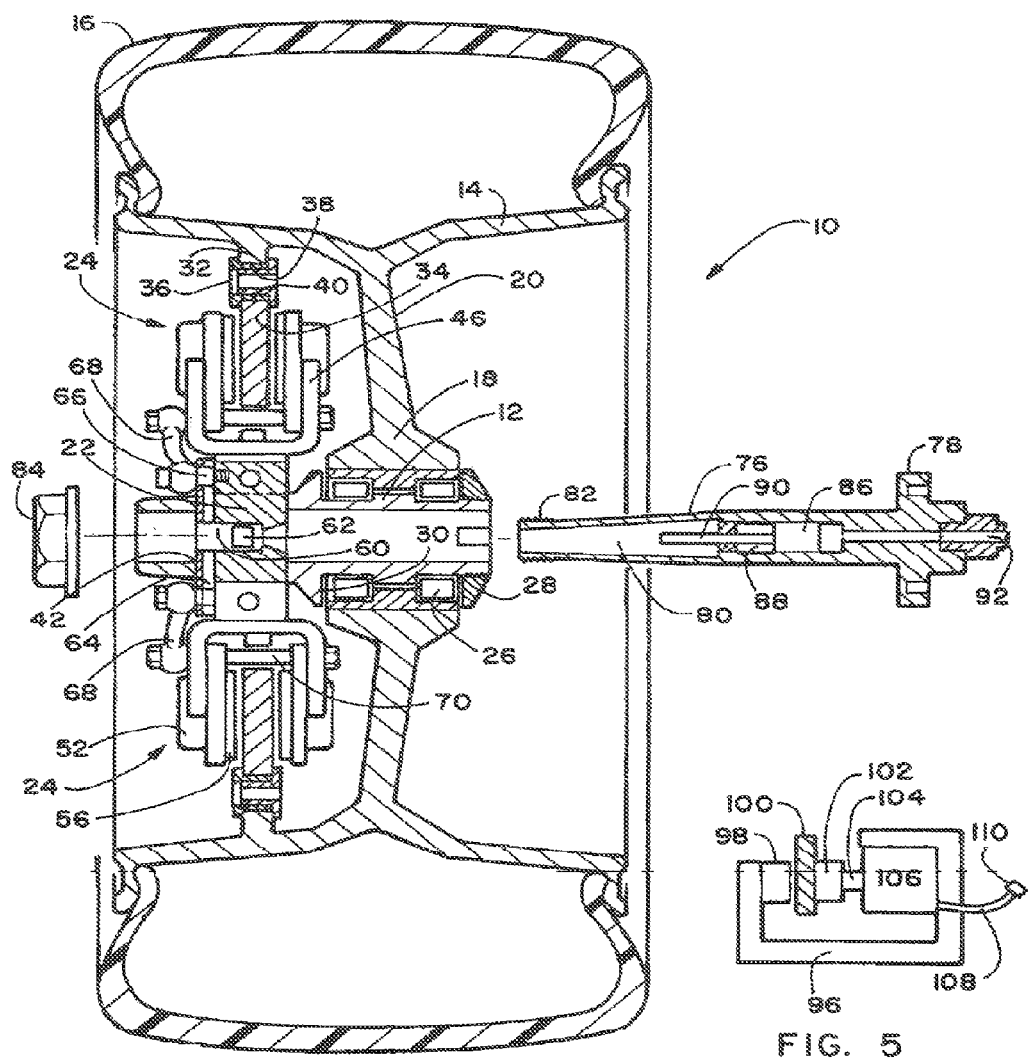
FIG. 1 is an elevation view in section of a wheel and brake assembly in accordance with one preferred embodiment of the invention.
FIG. 5 is an elevation view showing an electrically actuated caliper unit.
Figure 2:
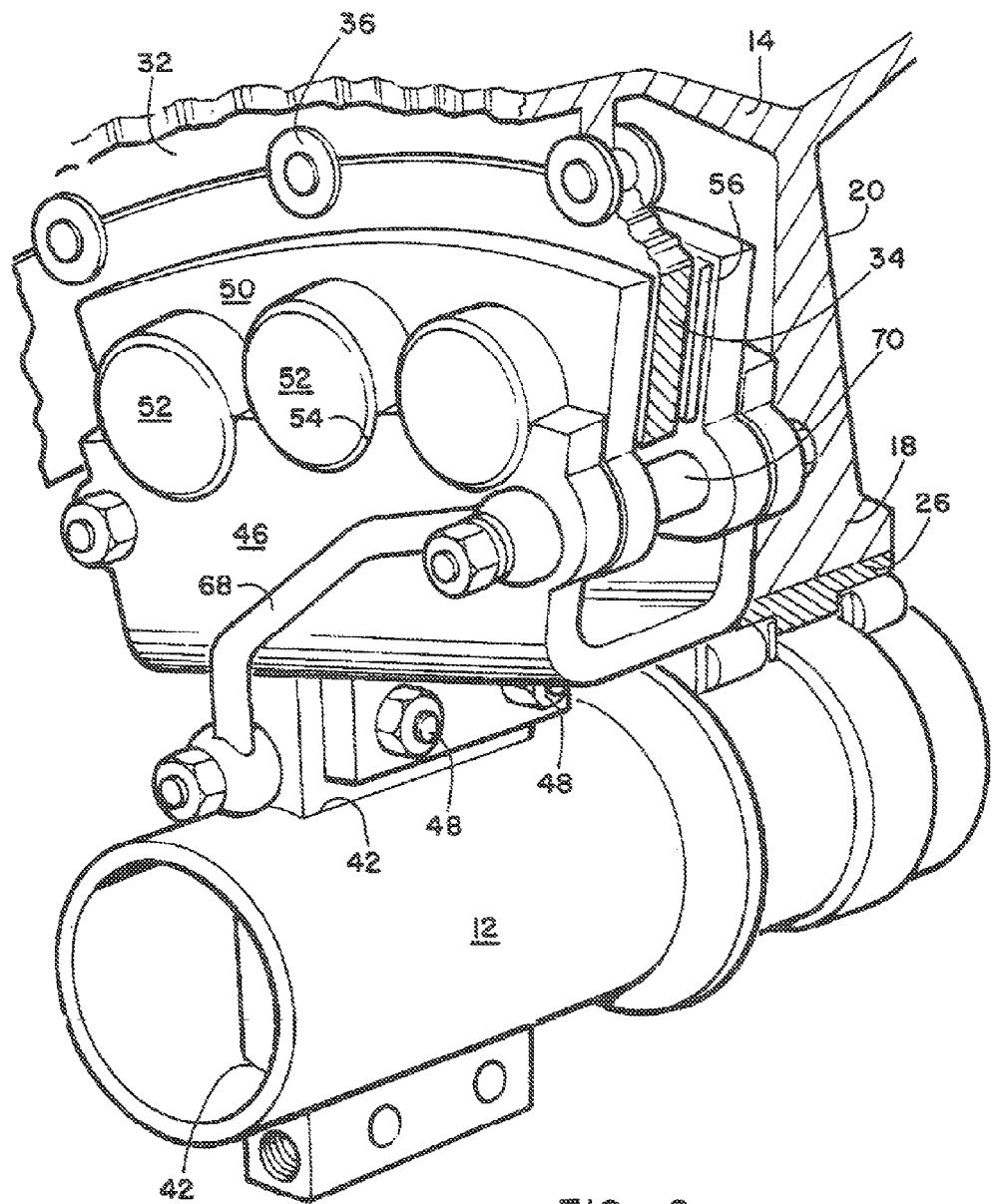
FIG. 2 is a perspective section view of the embodiment of FIG. 1.

Referring to FIGS. 1 and 2 of the drawings, there is illustrated an exemplary embodiment of a combination wheel and brake system in accordance with one embodiment of the invention. The system, designated generally by the numeral 10, comprises removable central mounting hub or sleeve 12 on which is mounted a wheel having an annular rim 14 for mounting a tire 16, a central hub 18 for mounting on the removable hub 12, and a web or spokes 20 connecting the rim to the hub; and the brake assembly comprises a caliper assembly including a central support member 22 and a pair of caliper units 24 mounted on the removable hub and a brake disc 26 mounted to an inner surface of the wheel rim. In summary the wheel and brake assembly are both mounted on a common removable hub or sleeve.

As illustrated in FIG. 1, the wheel is rotatably mounted by suitable roller bearings 26 retained on the sleeve by a nut 28 against a shoulder 30 on the sleeve. A circular or peripheral mounting lip or rim 32 is formed or mounted on an inner surface of the wheel rim for mounting a brake disc. A brake disc 34 is detachably mounted to the inner diameter of the lip 32 by studs 36 extending through bores formed as half circles 38 and 40 in each of lip 32 and disc 34 respectively. This form of mounting establishes a floating mounting of the disc to the wheel rim. This disc is the rotating or movable portion of the brake assembly and can be constructed of any suitable material such as metal or metal alloys, composite or combinations of metals and composites or coating materials of composites or ceramics on metals. The rotor can be constructed as solid, vented or laminated.

The stationary portion of the brake assembly includes central support member 22 which extends through slots 42 in opposite walls of the mounting hub or sleeve 12. A clamp—may encircle and clamp to the sleeve. A generally U shaped channel or bracket 46 is detachably attached to each end of the support member 22 such as by bolts 48 and has opposed walls that extend around and to opposite sides of brake disc 34. A multi-cylinder caliper actuator unit 50 is attached such as by bolts to each wall of the bracket 46 on opposite sides of the disc. Each caliper actuator unit has multiple cylinders 52 that nest in semi circular recesses 54 in each side wall of bracket 46. The cylinders are preferably of standard known construction with a piston within a cylinder and will not be described in detail. Each caliper actuator unit has a brake pad 56 disposed adjacent a surface of brake disc 34 and is biased by the pistons in the cylinders into engagement with the disc surface for braking.

Referring to FIG. 1, the illustrated brake assembly is hydraulically actuated with a closed system that is essentially self contained. The hydraulic system has a master cylinder including a cylinder 60 with a piston 62 disposed centrally of the support member 22 and connected by a passage 64 in the support member to ports 66 where line 68 connects to the cylinder unit 50. A crossover line 70 connects to the opposite bank of cylinders. Master cylinder piston 62 is retained in its cylinder by a shoulder and is adapted to be actuated by a plunger by a vehicle mounted actuator system which may be hydraulic, electromechanical, mechanical or the like. The caliper cylinders 52 are slave cylinders to the master cylinder and respond to movement of the master cylinder and the pressurized hydraulic fluid to move and actuate or apply the brakes. The master cylinder may be actuated or moved by any suitable means such as a mechanical plunger, or a hydraulic actuated plunger or an electrically actuated plunger.

In the illustrated embodiment an axle or axle stub 76 is adapted to mount to a vehicle chassis by flange 78 and to receive and detachably mount the sleeve or hub 12 of the wheel and axle assembly. The axle stub is provided with a slot an axially extending 80 for receiving the support member 22 and has threads 82 at the end thereof for receiving a retaining nut 84. Thus, the entire combination wheel and brake assembly can be mounted and retained by a single retaining nut 84. It will be appreciated that other forms of quick change retaining devices may be used.

A brake actuator unit in the axle includes a piston 86 mounted within a cylinder 88 and having a plunger 90 that extends into the mounting hub 12 and actuates or moves piston 64 to actuate the brakes. A source of hydraulic fluid for moving piston 86 and actuating the brake assembly in the wheel is supplied by a line 92 from a brake actuating system on the vehicle. The connection between the actuating system and the actuated system is a dry coupling in that there is no direct fluid connection. The just described wheel brake combination is for a non-drive wheel. Minor modifications would be necessary for application to a drive wheel as will be described hereinafter. The brake assembly is shown on the outside of the web or spokes of the wheel and recessed within the wheel. This arrangement provides easy access to the brakes for inspection and for maintenance or repairs. The disc may be constructed of any suitable material such as steel and alloys thereof, other metals and their alloys, ceramics, composites etc. The disc may be made of light central core with coatings or laminates of other materials such as metals, ceramics, composites etc.

Referring to FIG. 3 of the drawings, there is illustrated an exemplary embodiment of a combination wheel and brake system in accordance with the invention adapted for the driving wheels of a vehicle. The system, designated generally by the numeral 110, comprises removable central mounting hub or sleeve 112 on which is mounted a wheel, the wheel having an annular rim 114 for mounting a tire 116, a central hub 118 for mounting on the removable hub 112, and a web or spokes 120 connecting the rim to the hub. The brake assembly comprises a caliper assembly including a central support member a pair of caliper units 122 mounted directly on the removable hub 112 and a brake disc 134 mounted to an inner surface of the wheel rim. In summary the wheel and brake assembly are both mounted on a common removable hub or sleeve.

As illustrated in FIG. 3, the wheel is mounted for rotation by suitable roller bearings 126 on the sleeve and retained by a nut 128 against a shoulder 130 on the sleeve. The wheel is provided with an inner circular or peripheral mounting lip or rim 132 on the inner surface of the tire mounting rim for mounting a brake disc 134. The lip may be formed upon casting of the wheel or it may be added in any suitable manner such as by bolting, welding or the like. A circular brake disc 134 is detachably mounted to the inner diameter of the lip 132 by bolts or studs 136 extending through bores formed as half circles 138 and 140 in each of lip 132 and disc 134 respectively. This form of mounting establishes a floating mounting of the disc to the wheel rim. Other forms and techniques of detachably mounting the disc may be utilized. This disc rotates with the wheel and is the rotating or movable portion of the brake assembly.

The stationary portion of the brake assembly includes central U shaped support member bracket 142 attached such as by bolts 144 which extends through and secure directly to opposite walls of sleeve 112. The generally U shaped bracket 142 extends to opposite sides of brake disc 134 and mounts multi-cylinder caliper units 150. A multi-cylinder caliper actuator unit 150 has cylinders 152 that nest in semi circular recesses 154 in each side of bracket 142. Each caliper actuator unit has a brake pad 156 disposed adjacent a surface of brake disc 134 and is biased by the cylinders into engagement with the disc surface.

As illustrated, the brake assembly is hydraulically actuated with a closed system that is essentially self contained as in the FIG. 1 embodiment. This hydraulic system is essentially a slave system and has a master cylinder including a cylinder 160 with a piston 162 disposed centrally of the support member 122 connected by a passage 164 in the support member to ports 166 where line 164 connects to the cylinder unit 150 for actuation. A crossover line 170 connects to the fluid to the opposite bank of cylinders. Master cylinder piston 162 is retained in its cylinder by a shoulder and is adapted to be actuated by a plunger by a vehicle mounted actuator system which may be hydraulic, electromechanical, mechanical or the like.

In the illustrated embodiment a rotatable drive axle 176 is mounted in a stationary housing or hub 178 that is adapted to mount to a vehicle chassis or frame. The stationary housing or hub 178 is adapted receive the sleeve or hub 112 of the wheel and axle assembly. The drive axle 176 is is mouted in suitable roller bearings in housing 178 and is formed with threads 182 at its outer end for receiving a retaining nut 184. Thus the entire combination wheel and brake assembly can be attached and detached to the vehicle by the single retaining nut 184. It will be appreciated that other forms of quick change retaining devices may be used in place of a threaded nut.

The brake unit is dry coupled to the vehicle actuating system similar to that of FIG. 1 mounted on to one side of the axis of the axle. As shown in FIG. 4, the in wheel portion of the system includes a master cylinder 186 mounted on sleeve 112 and having a free piston 188 within the cylinder. Hydraulic lines 164 communicate with the cylinder and the caliper cylinders. An actuator unit 190 includes a cylinder with a piston 192 having a pin 194 extending into cylinder 186 and engaging piston 188 to move it to actuate the in wheel system. When the wheel assembly is mounted on housing 178 the vehicle system and the wheel system are coupled for operation. When the wheel assembly is removed, the systems are un-coupled with both systems\remaining in tact. The just described wheel brake combination is for a drive wheel. The brake assembly is shown mounted on the inside of the web or spokes of the wheel and recessed within the wheel. This arrangement enables quick removal of the entire wheel and brake assembly and provides easy access to the brakes for inspection and for maintenance or repairs.

The fluid in the system can be re-circulated by providing a series of one way valves that allows the fluid in the caliper pistons to re-cycle within the closed loop of the in wheel system. This extends the life of the fluid. In addition, the fluid can be cooled by adding fins to one or more of the lines of the system.

The present invention can also be implemented by any number of actuating systems including hydraulic, mechanical, electromechanical and hydromechanical actuating systems. Such a system could be electrically actuated with either electrical or electronic controls, either hard wired or wireless, for controlling the actuation. These are typically referred to as brake-by-wire systems and have some advantages and some disadvantages when compared to hydraulic systems. They can be lighter in weight and more controllable when such functionality as ABS, TCS, ASMS etc. are embodied. They are also more environmentally friendly than hydraulic systems in that thy are not prone to leak contaminating fluids. One of the disadvantages is the varying efficiency of the actuator in changing rough environmental conditions and wear. Another disadvantage is that expensive sensitive sensors are required for numerous parameters including force or torque. An electrical brake system would use calipers with either a solenoid or a toque motor to apply the brake force or pressure. The force or pressure would be applied to pads that engage a rotor or disc.

FIG. 5 schematically illustrates an electrically operated brake caliper assembly. A frame 96 is adapted to mount on either sleeve 12 of a FIG. 1 arrangement or on sleeve 112 of the FIG. 3 arrangement. A pad 98 is carried by frame 96 and disposed on one side of a brake disc or rotor 100. An opposing pad 102 is mounted on a shaft 104 connected to an electrical motor 106 which is activated to apply the braking pressure. The electric motor is connected by a suitable conductor 108 via a connector 110 to a controlled electrical power supply. The connector may be a plug and socket combination located in a structure and location similar to the piston 62 and pin 90 in FIG. 1. The motor may be either a linear or solenoid type or a rotary type. As a linear type it simply pushes the shaft 104 outward to press the pads against the rotor or disc. As a rotary type it would use a nut and screw applied to shaft 104 to move it linearly to apply the braking pressure.

While I have illustrated and described my invention by means of specific embodiments, it is to be understood that numerous changes, modifications and applications may be made therein without departing from the spirit and the scope of the invention as shown in the appended claims. For example, while the invention has been described in application to automotive vehicles, it may be applied to numerous other systems such as railway vehicles, trolleys, aircraft and the like.

I claim:

1. A dry couple in wheel brake assembly, comprising:
   a hub adapted for detachably mounting on an axle of a vehicle with a single retaining nut;
   a wheel mounted for rotation on said hub;
   at least a stationary component of a brake assembly comprising a caliper assembly including a support member mounted on said hub, the support member having a caliper unit mounted to it and an elongated support housing defining at least one arm and extending to a side of the axis of said axle, the elongated support housing having a portion that extends into a slot in said axle;
   a rotating component of a brake assembly mounted on and rotatable with said wheel; and
   a brake actuator mounted on said hub for actuating said brake assembly.

2. A brake assembly according to claim 1 wherein said rotating component is a disc.

3. A brake assembly according to claim 2 wherein said disc is detachably mounted to an inner lip within an inner surface of the rim of the wheel.

4. A brake assembly according to claim 1 wherein said rotating component is a disc detachably mounted within an inner portion of the rim of the wheel.

5. A brake assembly according to claim 1 wherein said caliper assembly comprises a self contained hydraulic actuating system which comprises:
- a cylinder in said support housing having a free piston mounted therein;
- a plurality of pistons in each of said caliper units; and
- a cylinder in said support housing having a free piston positioned therein;
- a plurality of pistons in each of said caliper units; and
- hydraulic fluid passages communicating between said cylinder and said pistons.

6. A brake assembly according to claim 5 wherein said free piston is positioned for engagement and actuation when said hub is detachably mounted on an axle of a vehicle.

7. A brake assembly according to claim 4 wherein said actuator comprises:
- a U shaped support member having at least one arm extending to opposite sides of said disc; and
- a cylinder on each of said arms for biasing a friction pad into engagement with a surface of said disc.

8. A brake assembly according to claim 1 wherein said brake actuator comprises:
- a support member having at least one portion extending to opposite sides of said disc;
- at least one brake pad carried by said support member and positioned on each side of said disc; and,
- an electric motor for biasing each of said brake pad into engagement with a surface of said disc.

9. A combined wheel and brake pad assembly, comprising:
- a hub adapted for detachably mounting on an axle of a vehicle;
- a quick connect device for detachably retaining said hub on said axle;
- a wheel mounted for rotation on said hub;
- at least a stationary component of a brake assembly mounted on said hub wherein said at least a stationary component of the brake assembly comprises a caliper assembly including a support member mounted on said hub, the support member having a caliper unit mounted to it and an elongated support housing defining at least one arm and extending to a side of the axis of said axle, the elongated support housing having a portion that extends into a slot in said axle;
- a brake disc detachably mounted on and extending radially inward from the wheel rim and rotatable with said wheel; and
- a self contained brake actuation system mounted on said hub for actuating said brake assembly.

10. A brake assembly according to claim 9 wherein said stationary component caliper assembly of said brake assembly mounted on said hub comprises a self contained hydraulic actuating system which comprises:
- a cylinder in said support housing having a free piston positioned therein;
- a plurality of pistons in each of said caliper units; and
- hydraulic fluid passages communicating between said cylinder and said pistons.

11. A brake assembly according to claim 9 wherein said brake actuator comprises:
- a support member having portions extending to opposite sides of said disc;
- at least one brake pad carried by said support member and positioned on each side of said disc; and,
- an electric motor for biasing each of said brake pad into engagement with a surface of said disc.

12. A quick mounting combined wheel and brake assembly, comprising:
- a hub adapted for detachably mounting on a suspension of a vehicle by attaching a single retaining device;
- a quick connect device for detachably retaining said hub on said suspension;
- a wheel having a rim mounted for rotation on said hub;
- at least one stationary component of a brake system mounted on said hub wherein said at least a stationary component of the brake assembly comprises a caliper assembly including a support member mounted on said hub, the support member having a caliper unit mounted to it and an elongated support housing defining at least one arm and extending to a side of the axis of said axle, the elongated support housing having a portion that extends into a slot in said axle;
- at least one rotating component of a brake system detachably mounted on the rim of said vehicle; and
- a self contained brake actuator mounted on said hub for actuating said brake assembly;
- wherein the hub, wheel and self contained brake actuator mounted on said hub are removable by removing the single retaining device and sliding the hub off the axle.

13. A brake assembly according to claim 12 wherein said rotating component is a disc detachably mounted within an inner portion of the wheel rim.

14. A brake assembly according to claim 13 wherein said brake actuator comprises:
- a support member having portions extending to opposite sides of said disc;
- at least one brake pad carried by said support member and positioned on each side of said disc; and,
- an electric motor for biasing each of said brake pad into engagement with a surface of said disc.

15. A brake assembly according to claim 12 wherein said caliper assembly comprises a self contained hydraulic actuating system which comprises:
- a cylinder in said support housing having a free piston positioned therein;
- a plurality of pistons in each of said caliper units; and
- hydraulic fluid passages communicating between said cylinder and said pistons.

16. A brake assembly according to claim 12 wherein said retaining device is a threaded retaining nut or bolt.

* * * * *